Dec. 20, 1966  G. E. SLEIGHTER  3,293,020
METHOD OF HEATING GLASS SHEETS
Filed June 6, 1963  4 Sheets-Sheet 1
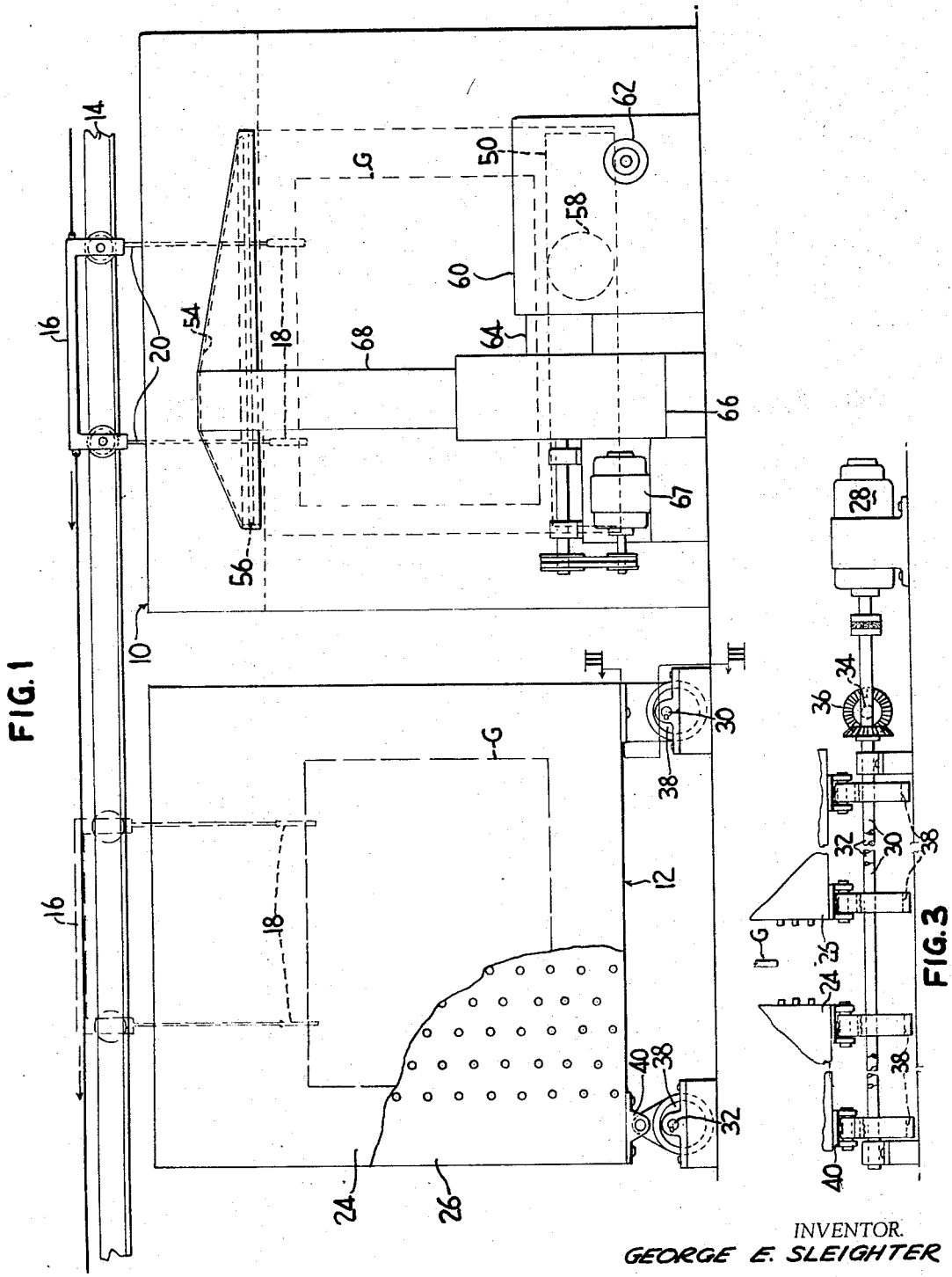
INVENTOR.
GEORGE E. SLEIGHTER
BY
Oscar L Spencer
ATTORNEY Dec. 20, 1966 G. E. SLEIGHTER 3,293,020
METHOD OF HEATING GLASS SHEETS
Filed June 6, 1963 4 Sheets-Sheet 2
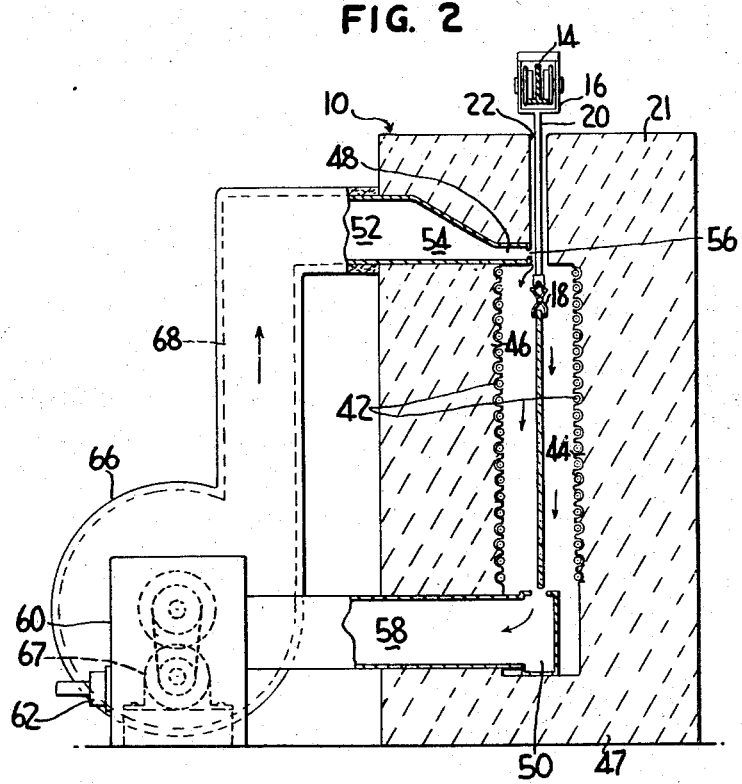
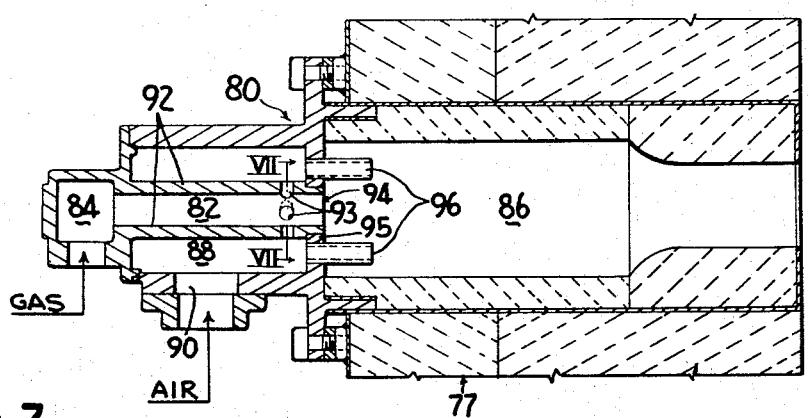
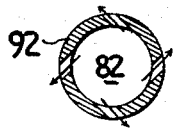
INVENTOR.
GEORGE E. SLEIGHTER
BY
Oscar L. Spencer
ATTORNEY

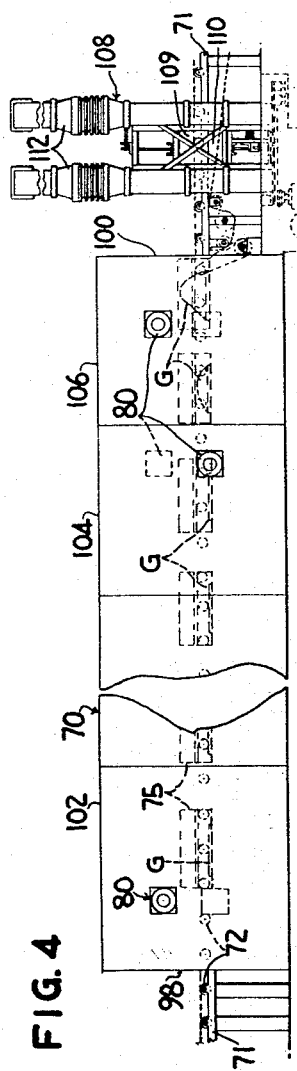
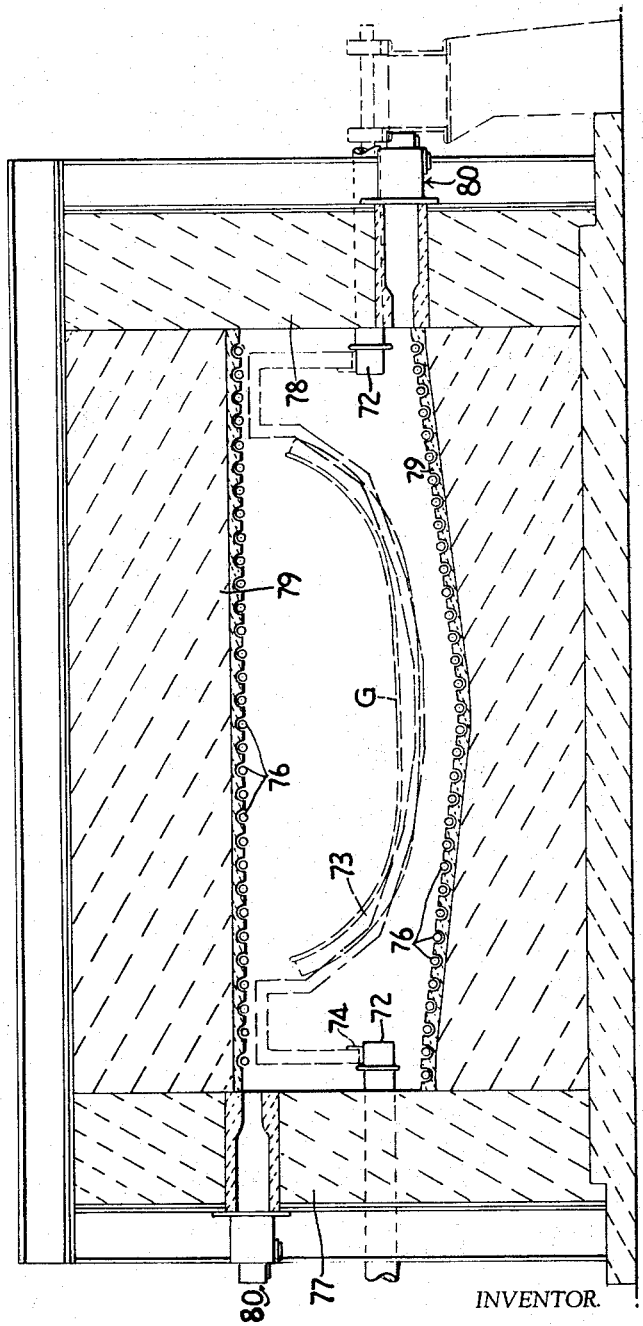

Dec. 20, 1966  G. E. SLEIGHTER  3,293,020
METHOD OF HEATING GLASS SHEETS
Filed June 6, 1963  4 Sheets-Sheet 4

INVENTOR.
GEORGE E. SLEIGHTER
BY
Oscar L. Spencer
ATTORNEY

United States Patent Office 3,293,020
Patented Dec. 20, 1966

3,293,020
METHOD OF HEATING GLASS SHEETS
George E. Sleighter, Natrona Heights, Pa., assignor to Pittsburgh Plate Glass Company, Pittsburgh, Pa., a corporation of Pennsylvania
Filed June 6, 1963, Ser. No. 286,020
1 Claim. (Cl. 65—111)

This invention relates to the fabrication of glass and more particularly to the heating of glass sheets, especially in conjunction with other operations such as tempering, bending, coating, and annealing such sheets. In each type of operation for which the present invention is adapted, it is necessary that the glass sheet be at an elevated temperature for at least a portion of the treatment cycle.

Glass sheets are fabricated through many known manufacting techniques, such as bending, tempering, annealing, coating, and combinations of such techniques to form end products having different characteristics and uses different from the original product. A common feature of these techniques is the heating of glass sheets to a temperature above that at which the major surfaces or the contour thereof is susceptible to be changed by a deforming stress on contact with a solid member, hereinafter referred to as the deformation temperature. The deformation temperature is above a temperature known as the strain point and below a temperature known as the softening point.

The softening point has been defined as that condition in which glass has a viscosity of $10^{7.6}$ poises. The annealing point has been defined as that condition in which the glass viscosity is $10^{13.4}$ poises, and the strain point is defined as that condition in which the glass viscosity in poises is $10^{14.6}$. The expressions "softening temperature," "annealing temperature," and "strain temperature" are the temperatures at which glass contains a viscous condition above recited. These are also known as the "softening point," the "annealing point," and the "strain point," respectively. For ordinary commercial soda-lime-silica plate or window glass, the strain point is about 960 degrees Fahrenheit, the annealing point is about 1015 degrees Fahrenheit, and the softening point is about 1350 degrees Fahrenheit.

Glass is tempered in order to place the surface layers in a permanent condition of compressive stress while the protected interior develops a tension stress to compensate for the compressive stress of the surface layers. Glass so tempered is more resistant to breakage caused by impact, abrasion, bending, and thermal shock than annealed glass which does not have its surface strengthened by a high state of compression.

Traditionally, glass has been tempered by exposure to radiant energy in order to heat the glass to a temperature approaching its softening point and then suddenly chilling the heated glass, either by prolonged application of air blasts or by quenching in a bath of liquid having high thermal capacity to remove the heat retained in the article at a relatively fast initial rate which gradually diminishes.

When glass is annealed, its temperature is raised above both the strain point and the annealing point and the glass is cooled in a controlled manner. Glass sheets must be raised in temperature above these points to shape the glass, to fuse a frit coating thereon or to form a metal oxide coating by applying a filming composition containing a metal salt or organic metal compound which hydrolizes upon contact with the hot glass. In each case, the surface is likely to be soft enough to deform by virtue of its being supported by solid members which contact the glass during its heating.

In the past, economic utilization of fabricating equipment has required that the glass sheets undergo treatment while hot. The necessity of conveying the glass sheets at high temperatures has heretofore resulted in undesirable deformation or marring of the major surfaces of the glass sheet being treated due to physical contact with the solid members which comprise supporting and conveying apparatus which contact the glass at elevated temperatures.

Known processes of increasing the strength of glass sheets involve exposing the glass to radiant heat and subsequently uniformly quenching the surface of the sheet. The most frequently used processes involve supporting the treated glass sheet in a vertical plane or in a horizontal plane by solid members.

Glass sheets are supported in a vertical plane by tongs whose solid glass engaging elements grip the sheets near their upper edges or by resting the bottom edge of a glass sheet on a mesh support carried by a conveyor. In the latter case, the glass sheet is held upright by solid fingers extending downward along each side of the upper edge of the glass. Such vertical processes leave tong marks or finger marks on the glass.

Glass is also supported for tempering by being conveyed in a horizontal disposition over a series of spaced conveyor rolls through a heating furnace. Such roller process leaves roller marks, scuff marks, and other defects, in addition to which a certain degree of "wave" distortion is inevitably imparted to the sheet as a consequence of the glass undulating over the spaced rolls as it softens in its travel.

The above problems apply also to the handling of glass sheets for other fabrication purposes requiring heating the glass to elevated temperatures. These include shaping or bending, annealing, and coating or filming.

When glass is simultaneously bent and tempered, the glass may be supported or suspended by tongs, heated above its deformation temperature and subjected to bending moments by application of weighted wires urging the glass to conform to a predetermined simple curve or by application of complementary male and female solid molding members capable of shaping the heat-softened glass to more complicated shapes. The tongs mar the glass when they engage the surface as do wires or solid portions of the pressing members. This surface marring is worse when contact occurs at higher glass surface temperature than at lower glass surface temperature.

Horizontal bending by gravity has been utilized to bend a sheet while it is being heated preparatory to its tempering operation.

Sheets of glass are mounted on a mold of outline configuration in which only a thin section of the major surfaces around the periphery of the glass being bent comes into contact with the outline mold surface. The glass is allowed to sag to conform to the shape of the mold surface under the influence of heat, sometimes aided by moments of force applied to movable mold sections. The central portion of the glass sheet has a tendency to sag uncontrollably because it must of necessity be heated to the deformation temperature in order to have its core sufficiently hot for tempering. Under such circumstances, the unsupported portion of the glass between the longitudinal side edges that come into contact with the mold cannot resist deformation.

The present invention provides a novel treatment of the glass sheet during its heating incidental to fabrication of the glass which reduces considerably the tendency of the glass surfaces to be marred by supporting elements. The present invention also reduces considerably the tendency of the glass to sag uncontrollably in the unsupported regions in those instances where the glass is bent by gravity sagging to an outline shaping surface while supported horizontally. The present invention also minimizes wave in glass conveyed on spaced rolls during heating.

The present invention accomplishes these results by simultaneously exposing the entire glass surfaces to currents of relatively cold fluid to retard heating of the surfaces while radiant heat sources facing at least one and preferably both of the glass sheet major surfaces radiate heat onto the glass sheet to raise the interior temperature of the glass to above its annealing point and approaching its softening point. The fluid is preferably relatively cold air which contacts the entire surface of the glass sheet while the latter is irradiated. The air is applied at a rate sufficient to break up a layer of stagnant air that usully is present at the glass surface when the glass is subjected to radiant heating. The exact rate of fluid flow could not be measured at the glass surface. However, several examples of rates for supplying fluid for different environments are mentioned in the specific examples which follow to serve as a guide for acceptable operations.

Prior to the present invention, it had always been considered to be impossible to heat a glass sheet interior from room temperature to above its strain point while the exterior surface of the sheet is kept relatively cool without introducing tension stresses at the glass surface that cause breakage. As a consequence, the glass fabrication industry either did not consider or overlooked the possibility of a heating process incorporating simultaneous surface cooling prior to the present invention.

The simultaneous application of convection current moderates the temperature rise of the glass surfaces to a greater extent than it affects the rate of temperature rise within the body of the glass. The surface layers of the glass sheets treated according to the present invention are harder than those of glass sheets treated according to conventional prior art techniques which omit the convection currents. The present invention thus enables the glass surfaces to resist deformation to a greater extent than workpieces treated by prior art techniques. In addition, the interior of the glass is heated as in prior art operations to a temperature sufficient to enable the glass to assume a tempered condition upon its sudden chilling following the heating operation, or to assume the shape desired by press bending or gravity sagging with minimum harm to the surface.

In cases where the glass undergoes a coating operation, the interior of the glass serves as a reservoir of heat that helps heat the glass surface to its filming temperature after irradiation is completed for a brief interval sufficient to produce a film or coating by hydrolyzing a metal salt composition sprayed or otherwise applied to the heated glass sheet to form a film containing metal oxide immediately after the latter leaves the furnace and before its surface temperature cools to below a temperature at which the film forms.

In order to determine whether the suggestion described above was practical, several experiments were performed. In the initial experiment, several samples were cast from plate glass to form one inch thick samples. Thermocouples were imbedded at the center of the midplane and ⅛ inch below the two opposing surfaces as well as at the surfaces of the samples.

The samples were supported midway between opposing gas fired burners operated at a surface temperature of about 2100 degrees Fahrenheit. The burners were separated from one another by 5 inches. Each glass sample tested was isolated from the hot products of combustion of the gas burners by a plate of fused silica by ⅛ inch thickness disposed immediately in front of each burner.

Air was flushed across the test samples during heating. The glass surface temperature was controlled by varying the rate of applying the air across the surfaces of the samples.

In order to avoid edge temperature effects and to simulate a larger sheet, the edges of the samples were insulated within a frame of an alumina-silica ceramic fiber sold under the trade name of Fiberfrax.

The glass samples were simultaneously heated and air applied to the surfaces until the surface reached the strain point. The surface temperature and the temperature ⅛ inch within the surface were both below that of the midplane of each sample. After 10 to 15 minutes of equilibrium, the heating was discontinued and the air application continued. Temperature measurements taken as the midplane cooled through the strain point indicated that the surface temperature continued to be less than the interior temperature of the samples.

The above experiments indicated that it was feasible to moderate the surface temperature to a greater extent than the interior temperature by a method combining radiant heating of the interior with surface cooling by convection.

Further experiments were performed on 12 inch square samples of glass sheets. Apparatus were designed using tubular quartz infrared lamps of the type General Electric 1600T3 arranged in two opposing banks of 24 lamps each separated from one another by 3¾ inches. The lamps of each bank were mounted in parallel relation to one another on ¾ inch centers. Each bank was divided into three sections. Each individual section was manually controlled through a saturable core reactor.

The banks of lamps were mounted on the inner wall of a plenum chamber having air supply slots ⅛ inch wide extending parallel to the length of the tubular lamps and centrally disposed between adjacent tubular lamps on 2¼ inch centers. Intermediate each of the air supply slots were two air escape slots disposed centrally in the spaces between adjacent tubular lamps not occupied by an air supply slot.

Air was supplied to the plenum chambers by two blowers capable of supplying 850 cubic feet per minute at a pressure of 8 ounces per square inch to each plenum. Glass motion was simulated by oscillating the apparatus along an axis perpendicular to the longitudinal dimension of the parallel slots and tubular lamps.

The glass sheets were held vertically between the banks of lamps by means of a stainless steel framework provided with spaced hairpin-like members which engaged the glass edges. The glass edges were insulated with a ⅜ inch wide frame of a ceramic fiber composed of alumina and silica sold under the trade name of Fiberfrax to minimize temperature variation due to edge effects.

An optical stress reading apparatus was set up in order to observe the stresses present in a glass sample heated by infrared radiation. The stress reading apparatus was oriented in the direction of the major surfaces and along an axis in the midplane of the glass.

Observations of several runs showed that the midplane of the glass sheet developed a tension stress immediately upon application of heat. This tension stress increased and then slowly decreased. When the surface of the sample reached the strain point (960° F.) the center tension value was near zero.

Compressive stresses were developed at the midplane by holding the surface temperature slightly above the strain point, using air currents to cool the surface while continuing the internal radiant heating. The midplane of the glass sheet was hotter than the surface and was attempting to expand while the cooler surface could not relax rapidly enough to relieve the internal stresses.

It was also determined that when glass sheets, while heated from room temperature, were simultaneously cooled too rapidly at their surfaces while their interiors were heated by radiation, they developed an inverse temperature gradient with a higher interior temperature than surface temperature. This inverse gradient, if sufficiently steep, caused the glass sheets to break before they were heated to the strain point.

The time required for relaxing thermal stresses is less at higher temperatures than at lower temperatures, and when the glass temperature is above the strain point, simultaneous surface cooling and internal heating using commercial equipment did not cause breakage.

In order to determine the actual gradient existing in one inch thick glass, a special laminated plate was prepared from two half-inch thick plates fused together with number 36 gauge chromel-alumel thermocouples sandwiched between the plates. The edge of the laminated sample was wrapped with insulation and the thermocouple leads were attached to permanent connections on the glass sheet support frame. The surface thermocouples were cemented to the sample. The glass was heated slowly to 1350 degrees Fahrenheit.

A midplane to surface temperature difference of 150 degrees Fahrenheit was developed by applying cool air into the plenum at an average pressure equal to 0.4 inch of water column while continuing the heating. This rate developed a surface temperature of 1200 degrees Fahrenheit.

When the cool air was introduced at a more rapid rate (at an average pressure equal to about 0.5 inch of water column) to lower the surface temperature to 1150 degrees Fahrenheit, the temperature difference between the midplane and the surface became 170 degrees Fahrenheit. Further increase in the rate of applying the cooling air to decrease the surface temperature to 1100 degrees Fahrenheit increased this temperature difference to 190 degrees Fahrenheit.

Another series of experiments was performed using the same equipment as in the immediately previous experiment with one half-inch thick plates 12 inches by 12 inches laminated from two ¼ inch thick sheets fused together with thermocouples imbedded into midplane. These experiments measured the temperature gradient possible with half-inch thick glass. Each sample was heated carefully to avoid breaking the plate.

With maximum heating available from the heating coils (63 kilowatts total input) and surface cooling air supplied to the plenums at a pressure equivalent to 0.3 inch of water column, a rate sufficient to hold the surface temperature at 1200 degrees Fahrenheit, the temperature of the midplane was heated to 1290 degrees Fahrenheit.

With the same heating rate, but increasing the rate of applying cooling air to a plenum pressure of 0.4 inch of water column, the surface temperature was 1150 degrees Fahrenheit and that of the midplane 1260 degrees Fahrenheit. The thermal gradient between the midplane and the surface increased to 110 degrees Fahrenheit. This was the maximum temperature differential obtainable with one half-inch thick plates with the above equipment. The maximum temperature differential between the glass surface and the midplane was also obtained using a plenum pressure equivalent to about 0.5 inch of water column at 1100 degrees Fahrenheit surface temperature and using a plenum pressure equivalent to about 0.6 inch of water column at 1050 degrees Fahrenheit surface temperature. In these latter experiments, the total thermal input was 63 kilowatts.

It was concluded from the above experiments that the moderation of the rate of surface temperature rise must be delayed until after the overall temperature of the glass sheet is high enough to enable stress relaxation to take place sufficiently rapidly to avoid breakage upon further heating. Once the glass sheets are heated to the vicinity of the strain point, it is possible to heat the glass interior to a temperature above the strain point while controlling the rise of the surface temperature by the simultaneous exposure of the glass surface to cool fluid while the entire sheet is further heated by radiant energy.

For glass ¼ inch thick and less, it was determined that for practical purposes in order to avoid spontaneous fracture due to the tension stresses established in the surface of the glass during its simultaneous irradiation and surface cooling that the rate of flow of cool air across the surface should preferably be limited to an amount such that the surface of the glass is not kept at a temperature substantially below that of the interior while raising the temperature of the glass sheet to its strain point.

Several applications combining the basic principles enumerated above with additional developments are disclosed in copending application Serial No. 286,050 of George W. Stilley and Harold E. McKelvey, filed on the same date as the present application.

In a typical operation utilizing flat glass sheets gripped by tongs, rejects were reduced to less than half of what they were utilizing a previously employed technique which omitted convection currents of gas.

Illustrative embodiments of apparatus capable of performing the present invention will be described.

In the drawings, wherein like reference numerals refer to like structural elements, FIG. 1 is a longitudinal elevation of a so-called vertical heating furnace capable of performing the present invention shown in conjunction with tempering apparatus;

FIG. 2 is a partial cross section and partial end elevation of the furnace portion of the apparatus of FIG. 1 showing the installation of a gaseous supply system in an electric heating furnace;

FIG. 3 is a fragmentary sectional view along the lines III—III of FIG. 1 showing a drive mechanism for operating the tempering apparatus to provide orbital movement relative to glass sheets undergoing sudden chilling;

FIG. 4 is a fragmentary, partly schematic, longitudinal elevation partly in section of an alternate embodiment of a furnace employing the present invention wherein glass sheets are supported in a substantially horizontal disposition for thermal treatment incidental to bending and tempering;

FIG. 5 is a cross-sectional view of the furnace of FIG. 4;

FIG. 6 is an enlarged sectional view of a high velocity gas burner of the type employed to produce rapid currents of hot gaseous flow according to a modified improvement of the present invention;

FIG. 7 is a detailed sectional view along the lines VII—VII of FIG. 6;

Figure 8:
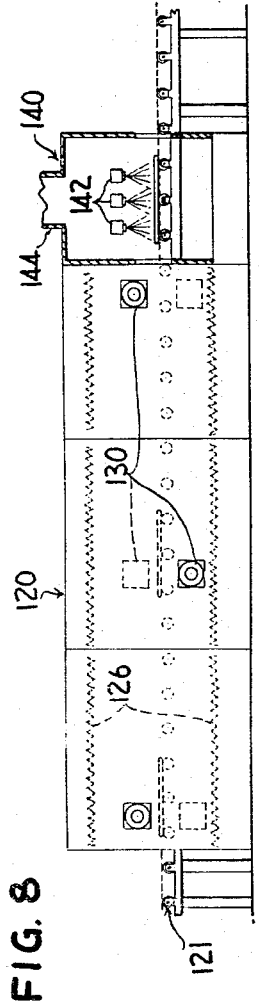
FIG. 8 is a longitudinal view of a roller hearth furnace using a modified improvement of the present invention to prepare glass sheets for coating.

Referring to the drawings, FIG. 1 shows a tunnel-like heating furnace 10 in end-to-end relation with a tempering apparatus 12. A monorail 14 extends along a horizontal path above the roof of the furnace and the tempering apparatus for conveying cars 16 from which are suspended tongs 18. The latter are attached at the bottom of vertical rods 20 which attach the tongs 18 to the cars 16.

The upper wall 21 of the furnace is provided with a thin longitudinal slot 22 along its entire length to permit clearance for the tong supporting rods 20. Thus, the tongs 18 and glass sheets gripped thereby are able to traverse the furnace 10 when the cars 16 move along the monorail 14. Thus, the monorail 14 is located in a vertical plane containing a path of movement of the glass sheets through the furnace 10 of the tempering apparatus 12.

Beyond the furnace 10 is the tempering apparatus 12 comprising a pair of nozzle boxes or plenum chambers 24 and 26 disposed on opposite sides of the vertical plane occupied by the monorail 14. Nozzle boxes 24 and 26 are each provided with a set of nozzles that extend toward one another through the inner walls of the plenum chambers and are connected to a suitable source of air under pressure to a compressor (not shown).

A motor 28 directly drives a drive rod 30. The latter drives a driven rod 32 through a connecting rod 34 which engages rods 30 and 32 through bevel gearing 36 at its ends. Each rod 30 and 32 has eccentrics 38 mounted thereon. The eccentrics 38 are pivotally connected to a bracket 40 at the bottom of each nozzle box 24 and 26. The above structure maintains a fixed spacing between the opposed plenum chambers while actuating their movement in unison in spaced orbital paths to quench a heated glass sheet supported therebetween in a manner well known in the art.

The furnace is provided with a series of electrical heaters 42 supported along the inner side walls 44 and 46 thereof (FIG. 2). A bottom wall 47 supports side walls 44 and 46 and forms the bottom of the furnace 20.

Side wall 46 is apertured along its length to provide a top passage 48 and a bottom passage 50. The top passage 48 communicates with an inlet conduit 52 at a chamber 54 which tapers in height from the inlet conduit 52 toward the center of the tunnel-like furnace in a direction transverse to the axis of monorail conveyor 14. The chamber 54 also tapers in height forwardly and rearwardly along the length of the furnace 10 from its connection with the inlet conduit 52. The top passage 48 terminates in a narrow, horizontally disposed slot 56.

The bottom passage 50 communicates with an outlet passage 58 that leads into a combustion chamber 60. The latter is provided with a gas burner 62 containing the usual air inlet, gas inlet, mixing chamber, pilot and main valves, which are not shown because the specific construction thereof is not a part of the present invention and many commercially available gas burners are suitable for use with the apparatus described in this portion of the description.

A duct 64 extends between the combustion chamber 60 and a fan housing 66. The latter contains a fan driven by a fan operating motor 67. An outlet duct 68 communicates between the fan housing 66 and the inlet conduit 52. When the fan in the fan housing 66 is operated, convection currents of a mixture of combustion products from the combustion chamber 60 are circulated in the direction of the arrows shown in FIG. 2. An identical blowing system (not shown) may be located on the opposite side of the furnace from the one illustrated to insure equal and opposite flows of fluid down the opposite major surfaces of the treated glass sheets.

The inlet conduit 52, duct 64 and the outlet duct 68 are all covered with a blanket of thermal insulation. This improves the thermal efficiency of the system by reducing the heat loss of the moving gas.

The gas fired recirculating system hereinabove described provides a downward flow of fluid along the major surfaces of the glass sheet suspended vertically within the furnace 10. This minimizes stratification of air in the furnace, avoids the establishment of a hot layer of stagnant air at the glass surface and reduces the likelihood of local variations in temperature.

The recirculating fluid, which is a mixture of combustion products and excess air, is forced into the top of the furnace and is withdrawn from the bottom of the furnace. The positive gaseous flow through the circulating system provides an atmosphere within the furnace slightly above atmospheric pressure.

This superatmospheric pressure within the furnace reduces the likelihood of the entry of random cold air currents into localized portions of the furnace. Also, the positive pressure within the furnace forms somewhat of a barrier to the entry of cold air from the tempering apparatus to the furnace.

Prior to the installation of the recirculating fluid supply system, a survey of the glass temperature within the furnace showed that the temperature of the glass sheet heated for tempering in the furnace varied from sheet to sheet by as much as 40 degrees Fahrenheit. In addition, temperature differentials of as much as 40 degrees Fahrenheit were experienced between different portions of a glass sheet conveyed through the furnace. Thus, flat glass sheets were warped during the furnace heating step. Some sheets were bent into compound shapes with sharp kinks along the unsupported edges quite prevalent.

Considerable breakage was experienced, particularly with larger sizes of glass. This is believed attributable to the thermal stresses established between the different portions of the glass sheet caused by uneven heating of the entire sheet aggravated by localized cooling due to random currents of cool air against one or more localized portions of the sheet.

The particular furnace in which the recirculating system was installed was capable of handling glass sizes up to 72 inches by 108 inches. The furnace was provided with electrical heating elements of 383.5 kilowatts capacity uniformly distributed over an area of 131 square feet.

The temperature of the gas supplied through the recirculating system in a downward movement along the vertical surfaces of the glass was kept below the temperature of the glass when the latter was withdrawn from the furnace by supplying 730 cubic feet per hour of gas and 8300 cubic feet of air to the gas burner. The furnace had a volume of 63 cubic feet and the fan a capacity of supplying a pressure equal to 9½ inches of water column at the rate of 3800 cubic feet per minute. Since the fluid was removed at the rate of 2800 cubic feet per minute into the combustion chamber, the furnace operated with a positive pressure equal to about 0.2 inch of water column. The excess gas escaped through vents in the furnace and through the entrance and exit openings when doors normally covering the openings were opened to permit the entry of a glass sheet or the removal of a heated glass sheet.

Experiments were performed employing recirculated fluids reheated to temperatures as high as 1250 degrees Fahrenheit. However, the upper temperatures of the range explored were unsatisfactory because the glass was too soft at such temperatures and the tongs penetrated too deeply into the glass to produce an acceptable product. When the air-to-gas ratio was increased by supplying 400 cubic feet per hour of gas and 7000 cubic feet per hour of air, the gaseous products were introduced at 1120 degrees Fahrenheit. This temperature exceeded the initial glass surface temperature and was below the ultimate glass surface temperature.

The best results were obtained in the particular furnace utilizing the air-gas mixture described previously with an electrical system of heating elements providing 383.5 kilowatts over 131 square feet of wall space.

Since the gaseous products were circulated in a downward direction throughout the entire length of the furnace initially, the recirculating gas accelerated the heating of the glass sheet surfaces during the early part of the heating cycle. Only after the glass had been heated to approximately the temperature of the recirculating gas did the retardation of the surface heating rate take place.

In the apparatus disclosed hereinabove, the surface temperature of the glass sheet without convection currents across the glass sheet surface was 1220 degrees Fahrenheit. After the introduction of recirculaitng gaseous currents at a temperature of 1120 degrees Fahrenheit, the surface temperature of the glass sheets at the end of the heating cycle averaged 1170 degrees Fahrenheit. The interior or core temperature of the glass sheets in both instances was sufficient for tempering.

The recirculating system has increased the rate of production by 20 percent and has decreased the rate of rejects by about 60 percent in the furnace depicted in FIGS. 1 to 3.

FIGS. 4 through 7 disclose another embodiment utilizing fluid flow to moderate the surface temperature of a glass sheet supported horizontally during bending and tempering. In this second embodiment, a horizontally disposed furnace 70 is shown with a support structure 71 for a series of conveyor rolls 72. The conveyor 72 transports sectionalized outline molds 73 by providing rolling support of sled-like rails 74 of conventional mold supporting carriages 75. The furnace is provided with electrical heating elements 76 disposed to radiate heat toward a plane of support for the glass sheet movement that is substantially parallel to the left side wall 77 and the right side wall 78 of the furnace 70. Heating elements 76 are mounted in the upper and lower walls 79 of the furnace.

The voltage to each electrical heating element is controlled as depicted in U.S. Patent No. 3,068,672. The electric heating elements provide a series of consecutive radiant heating patterns along the length of the conveyor 72 for heating the glass sheets and cause them to sag into conformity with the shaping surface of the moving bending molds 73.

Gas burners 80 are supported in openings in the left wall 77 and in the right wall 78 looking along the direction shown in FIG. 5. The gas burners 80 are arranged in pairs with one of the pairs disposed through wall 77 being laterally opposite but vertically offset with respect to the other burner of the pair.

In the section shown in FIG. 5 the burner extending through the left wall 77 is disposed to apply at a higher velocity toward the right wall 78 an air-gas mixture containing an excess of air and heated combustion products at a level above the top surface of the glass sheet supported for bending whereas the gas burner facing inward from the right wall 78 provides a high speed flow of heated combustion products and air toward the left wall 77 at a level below the undersurface of the glass sheet. The set of burners disclosed in FIG. 5 provides a generally clockwise motion of fluid at a relatively high velocity across the depicted section of the furnace 70. Additional pairs of burners spaced lengthwise of the furnace provide alternate counterclockwise and clockwise high speed flows of gaseous products mixed with air within the furnace.

The speeds of fluid flow are sufficiently rapid to avoid the establishment of a stagnant layer of hot air at the major surfaces of the glass. The flow of combustion products hotter than the initial glass temperature helps raise the glass sheet temperature during the early stages of the heating cycle. The temperature of the flowing fluid in the later stages of the heating operation is below the temperature of the radiant heat sources. Thus, the maximum glass surface temperature attained during the heating cycle is controlled to be less than the surface temperature attained without the positive fluid flow.

The fluid flow raises the pressure within the furnace to above that of the surrounding atmosphere. This positive pressure reduces the tendency of random currents of cold air to enter the furnace and cool the glass locally, thereby stressing the sheet and causing the likelihood of breakage.

Referring now to FIGS. 6 and 7, a typical gas burner 80 supported within the opening in the furnace wall 77 will be described. The burner comprises a centrally disposed gas inlet chamber 82 communicating with a gas inlet housing 84 which is internally threaded to receive a gas supply pipe (not shown).

The gas inlet chamber 82 is of substantially cylindrical configuration and supplies gas axially inwardly into a cylindrically shaped mixing and combustion chamber 86. An air supply chamber 88 of substantially torus cross section is supplied air through an air supply housing that is internally threaded to receive an externally threaded nipple of an air supply pipe (not shown). The air supply chamber 88 completely surrounds the gas inlet chamber 82, and a cylindrically shaped wall 92 separates the gas inlet chamber 82 from the air supply chamber 88.

Circumferentially arranged ports 93 are disposed near the axially inner end of cylindrical wall 92 and extend tangentially of their point of entry. The gas supply chamber 82 has an exit port 92 communicating with the mixing combustion chamber 86. The inner wall 95 of the air supply chamber 88 is pierced by circumferentially arranged air supply pipes 96 of cylindrical shape that communicate between the end of the air supply chamber 88 and the combustion and mixing chamber 86. Ports 93 permit some premixing of fluid between the air supply chamber 88 and the gas inlet chamber 82 before the main mixture takes place in the combustion and mixing chamber 86.

The end of the combustion and mixing chamber adjacent the inner side of wall 77 tapers in cross section to increase the velocity of the gaseous products imparted from the combustion and mixing chamber 86 into the furnace cavity. This construction accelerates the velocity of the combustion products to a velocity sufficient to provide gaseous movement completely across the furnace width.

The axis of each burner 80 extends transversely of the length of the furnace to enable the high velocity flow of combustion products and excess air to move in a direction transverse to the length of the furnace and parallel to a major surface of the glass sheet undergoing treatment.

The furnace 70 of the embodiment of FIGS. 4 and 5 is of the continuous type and extends from an entrance 98 to an exit 100. The conveyor rolls 72 traverse in succession a first preheat zone 102, a second preheat zone 104, and a bending zone 106 all disposed between the entrance 98 and the exit 100 of furnace 70. A tempering apparatus 108 located beyond the exit 100 is also traversed by the conveyor rolls 72.

The latter includes upper plenums 109 and lower plenums 110 having openings facing the surfaces of the bent glass sheets. Air under pressure is supplied through the plenums from a source (not shown) through flexible conduits 112 and the plenums 109 and 110 are moved orbitally in unison by a motion imparting mechanism 114 as is conventional in this art.

In a typical horizontal continuous system, the burners near the loading end (first preheat zone 102) of the furnace supplied 254 cubic feet of gas per hour which produced combustion products at a velocity of 135 feet per second at a temperature of 1300 degrees Fahrenheit as they left the burner. In the second preheat zone, 116 cubic feet of gas per hour was supplied to produce combustion products at a velocity of 77 feet per second at 775 degrees Fahrenheit at the exit of the burner, and a third set of burners in the bending zone near the exit of the furnace supplied 180 cubic feet of gas to produce combustion products at a velocity of 95 feet per second at 1100 degrees Fahrenheit at the burner exits. Each of these gases was mixed with sufficient air to obtain the temperature desired. Electrical power supplied to the system was 1103 kilowatts, of which 385 kilowatts was furnished in the first preheat zone, 284 kilowatts at the second preheat zone, and 434 kilowatts in the bending zone.

The first set of burners at the first preheat zone beyond the entrance increased the ambient temperature in the first preheat zone and increased the heating rate for the glass surface as well as the interior. At the second preheat zone, the heating rate at the surface was retarded to provide a tougher skin or surface of the glass, thus reducing the tendency for the glass sheet to be marked or deformed by the supporting mold.

At this stage of the bending cycle, the glass sheet interior became plastic enough to be shaped. After the glass completed its contact with the mold in the bending zone, the third set of burners nearest the exit provided a flow of hot gases sufficient to moderate the thermal differences along the length of the bent glass, particularly when the glass was exposed to a heating pattern of radiant heaters energized at sufficiently different radiant levels to cause intensely heated portions of the glass sheet transported laterally through the furnace to be bent relatively sharply while other portions simultaneously exposed to other heaters of less intensity were bent substantially lesser amounts.

Figure 9:
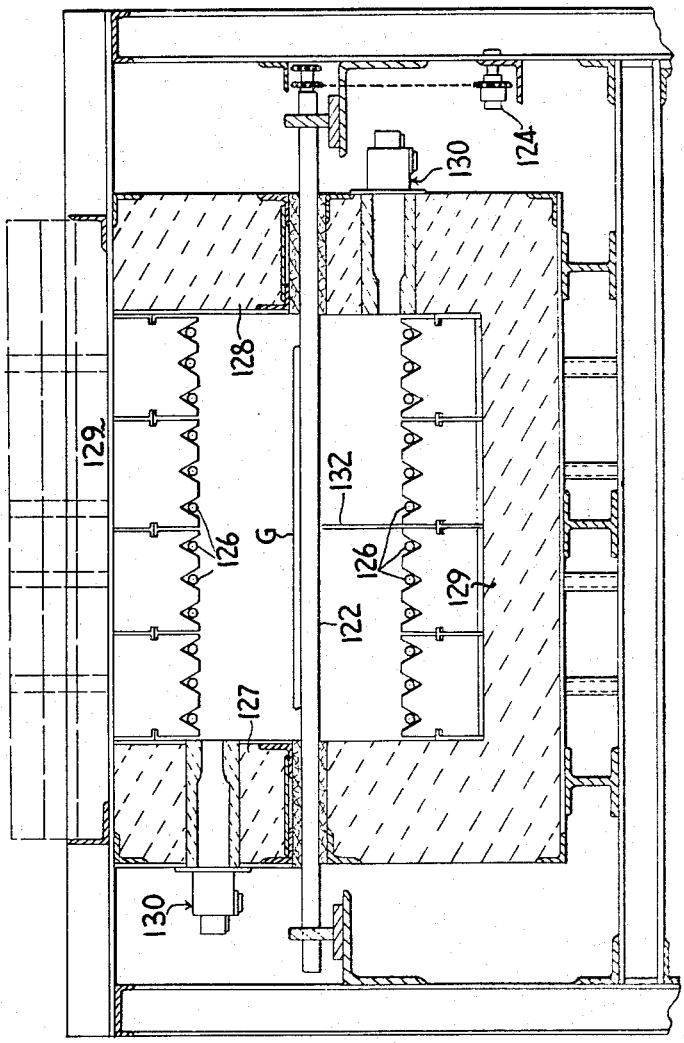
FIG. 9 is a cross-section of the furnace of FIG. 8.

The principles enunciated for the embodiment of FIGS. 4 to 7 can be applied equally usefully for roller hearth furnaces such as illustrated in FIGS. 8 and 9. Here, glass sheets G are conveyed while supported on rollers through a heating furnace. High velocity flows of hot gases across the upper and lower surfaces of the glass sheets improve the surface hardness and reduce the tendency of the hot glass sheets to be deformed as they contact successive, spaced rolls. Since the rollers are permanently installed in a furnace, their temperatures approach that of the ambient atmosphere and the glass sheets G are less likely to suffer damage from "chill-cracking" during their heating.

In the embodiment of FIGS. 8 and 9, a tunnel-like furnace 120 is traversed by a conveyor 121 comprising a series of transversely extending rollers 122 spaced longitudinally therealong. A drive motor 124 and suitable chain and sprocket drive means cause the rollers 122 to rotate and convey a plurality of glass sheets along the furnace. Heating elements 126 are supported by the upper and lower walls 129 of the furnace. The conveyor rolls 122 have their glass support surfaces located in a plane intermediate the upper and lower heaters.

The furnace has a left wall 127 and a right wall 128. Gas burners 130, similar to the burners 80 of the previous embodiment, are arranged in pairs, one above and one below the plane of the conveyor rolls 122. One burner of each pair extends in a substantially horizontal direction through wall 127 toward wall 128 for directing combustion products at high velocity toward wall 128, while the other burner of the pair extends in a substantially horizontal direction through wall 128 toward wall 127 for directing combustion products at high velocity toward wall 127. Alternate pairs of burners are disposed in alternate arrangements top to bottom through the respective walls to provide alternate clockwise and counterclockwise flows of combustion products across the path of movement of the glass sheets G through the furnace 120.

The furnace also includes a thermosensitive device 132 that senses the surface temperature of the glass sheets conveyed immediately adjacent thereto.

A filming station 140 comprising a battery of one or more spray guns 142 mounted for movement transverse to the longitudinal axis of the conveyor, such as depicted in U.S. Patent No. 2,899,929 to Monroe, is located beyond the exit of the furnace 120. The spray guns 142 are located above the conveyor path and oriented to impart a filming composition onto the upper surface of the glass sheets G transported along the conveyor rolls 122.

Additional glass treatment means, such as a tempering station (not shown) or an annealing lehr (also not shown), may be included beyond the filming station or substituted therefor, depending upon the fabrication operation that is to be performed on the glass sheets. Similarly, the earlier embodiments of furnaces may be employed for purposes other than those specifically illustrated. For example, the furnace of the embodiment of FIGS. 1 to 3 may also be employed with press bending apparatus or filming apparatus and the furnace of the embodiment of FIGS. 4 and 5 may be employed with coating apparatus, for example, in addition to or instead of the operation initially illustrated. This latter embodiment may be provided with radiant heaters in the top wall only and fluid supply means extending through the side walls of the heating furnace.

The gist of the present invention is the suggestion of heating a glass sheet to substantially its strain point or at least about 50 degrees Fahrenheit below the strain point, and then applying a relatively cool fluid against the major surfaces of the glass sheets while the latter are being heated by irradiation from a temperature slightly below the strain temperature to an elevated temperature sufficiently above the strain temperature as is necessary for fabrication. The rate of application of fluid is sufficient to reduce the surface temperature substantially below what it would be in the absence of said fluid application so that the glass surfaces are more resistant to deformation when the glass sheet attains the elevated temperature requisite for further application. Postponing the application of cold fluids to the glass surfaces until after the glass temperature approaches its strain point avoids the likelihood of spontaneous breakage during the early stages of heating and renders the present method more susceptible of mass production techniques.

The form of the invention shown and described in this disclosure represents an illustrative preferred embodiment and certain modifications thereof. Each of the illustrative embodiments of furnace illustrated, vertical and horizontal, and glass support methods described, may be employed for tempering, filming, annealing, and other fabrication uses other than the specific fabrication technique described. It is understood that various changes may be made and that the present invention may be employed in other environments where heating of the glass is an important part of the operation without departing from the spirit of the invention as defined in the claimed subject matter which follows.

What is claimed is:

A method of heating a glass sheet having at least one major surface thereof in contact with a solid member capable of deforming said glass sheet at elevated temperature incidental to treating the latter at elevated temperatures comprising first exposing the glass sheet to radiant energy to raise its surface temperature to the vicinity of its strain point and immediately thereafter applying a cool fluid to its surface to moderate its surface heating rate while continuing to irradiate the glass sheet until its interior temperature exceeds the strain point, characterized by initiating the application of said cool fluid to said surface when said surface temperature approaches the strain point of said glass.

References Cited by the Examiner

UNITED STATES PATENTS 2,068,799  1/1937  Guyer _____ 65—115
3,062,520  11/1958  Frey et al. _____ 263—8

DONALL H. SYLVESTER, *Primary Examiner.*

A. D. KELLOGG, *Assistant Examiner.*